United States Patent
Montemurro et al.

(10) Patent No.: US 9,706,486 B2
(45) Date of Patent: **\*Jul. 11, 2017**

(54) SYSTEM AND METHOD FOR CONTROLLING NETWORK SCAN PARAMETERS FOR A NETWORK CONNECTION

(71) Applicant: BlackBerry Limited, Waterloo (CA)

(72) Inventors: Michael Peter Montemurro, Toronto (CA); Stephen McCann, Southampton (GB); Richard Howard Kennedy, Austin, TX (US)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/069,562

(22) Filed: Mar. 14, 2016

(65) Prior Publication Data

US 2016/0227478 A1 Aug. 4, 2016

Related U.S. Application Data

(63) Continuation of application No. 13/622,906, filed on Sep. 19, 2012, now Pat. No. 9,319,968.

(51) Int. Cl.
*H04W 48/16* (2009.01)
*H04W 52/02* (2009.01)
*H04W 36/24* (2009.01)

(52) U.S. Cl.
CPC .......... *H04W 48/16* (2013.01); *H04W 36/24* (2013.01); *H04W 52/0209* (2013.01); *H04W 52/0216* (2013.01); *Y02B 60/50* (2013.01)

(58) Field of Classification Search
None
See application file for complete search history.

(56) References Cited

U.S. PATENT DOCUMENTS 9,125,140 B2 * 9/2015 Maniatopoulos ..... H04W 48/16
9,319,968 B2 * 4/2016 Montemurro ......... H04W 48/16
(Continued)

FOREIGN PATENT DOCUMENTS

EP 1739995 1/2007
WO 2007024346 3/2007

OTHER PUBLICATIONS

IEEE, Part 11: Wireless LAN Medium Access Control (MAC) and Physical Layer (PHY) Specifications, IEEE Std 802.11™—2012, published Mar. 29, 2012, 2793 pages.

(Continued)

*Primary Examiner* — Alex Skripnikov
(74) *Attorney, Agent, or Firm* — Fish & Richardson P.C.

(57) ABSTRACT

A system and method for controlling aspects of network communications from a device to a network are provided. In particular, a method of initiating scans for a network by a communication device for a communication network is provided. The method comprises: monitoring for a first condition relating to a network scan for the communication network; and when the first condition relates to a receipt of at least one request to initiate the network scan and when at least the first condition is satisfied, identifying a first parameter for the network scan and configuring and initiating the network scan at the communication device for the communication network implementing the first parameter.

21 Claims, 5 Drawing Sheets

(56) References Cited

U.S. PATENT DOCUMENTS

| | | |
|---|---|---|
| 2004/0120278 A1 | 6/2004 | Krantz et al. |
| 2005/0091357 A1 | 4/2005 | Krantz et al. |
| 2005/0097370 A1 | 5/2005 | Idan et al. |
| 2008/0081618 A1 | 4/2008 | Krantz et al. |
| 2008/0096572 A1 | 4/2008 | Hsu et al. |
| 2008/0132296 A1 | 6/2008 | Willey |
| 2009/0067398 A1 | 3/2009 | Green et al. |
| 2009/0109995 A1 | 4/2009 | Alam et al. |
| 2009/0137247 A1 | 5/2009 | Mok |
| 2010/0177673 A1 | 7/2010 | Yoon |
| 2011/0165873 A1 | 7/2011 | Gidvani |
| 2011/0176504 A1 | 7/2011 | Patel |
| 2012/0287914 A1* | 11/2012 | Smith ................ H04W 76/002 370/338 |
| 2013/0159345 A1 | 6/2013 | Kahtava et al. |

OTHER PUBLICATIONS

IEEE, Part 11: Wireless LAN Medium Access Control (MAC) and Physical Layer (PHY) Specifications, Amendment 1: Prioritization of Management Frames, published Apr. 6, 2012, 52 pages.
European Patent Office, Extended European Search Report issued in EP Application No. 12184957.4, dated Feb. 20, 2013, 7 pages.

* cited by examiner

SYSTEM AND METHOD FOR CONTROLLING NETWORK SCAN PARAMETERS FOR A NETWORK CONNECTION

CROSS REFERENCE TO RELATED APPLICATION

This patent is a continuation of U.S. application Ser. No. 13/622,906, filed Sep. 19, 2012, the entire contents of which is hereby expressly incorporated by reference herein in its entirety.

FIELD OF DISCLOSURE

The disclosure describes generally a system and method for controlling network scan parameters for a network connection in a communication network. In particular, the disclosure relates to controlling parameters relating to when and how often network connection scans are conducted for an access point (AP) device in a wireless network, such as a Wireless-Fidelity (W-Fi) (trade-mark) network.

BACKGROUND OF DISCLOSURE

Wireless mobile communication devices perform a variety of functions to enable mobile users to stay organized and in contact with others in a communication network through e-mail, schedulers and address books. Wireless devices are designed to enter and leave different wireless networks.

Wireless networks utilize communication hubs to communicate with the wireless devices. Some hubs provide access points (APs) to their networks as hard wired terminals. Wireless hubs are also available that have dual functions to maintain wireless connections for their associated devices in the network and to provide local functions for their user. As wireless devices and/or APs move, the connections between the devices and the networks may be disconnected and/or may need to be confirmed. This is done by the wireless device initiating scan(s) to communicate with the APs. Prior art systems use set scanning periods for the device.

BRIEF DESCRIPTION OF THE DRAWINGS

Embodiments of the invention will now be described, by way of example only, with reference to the accompanying drawings, in which.

DESCRIPTION OF EMBODIMENTS

Figure 1A:
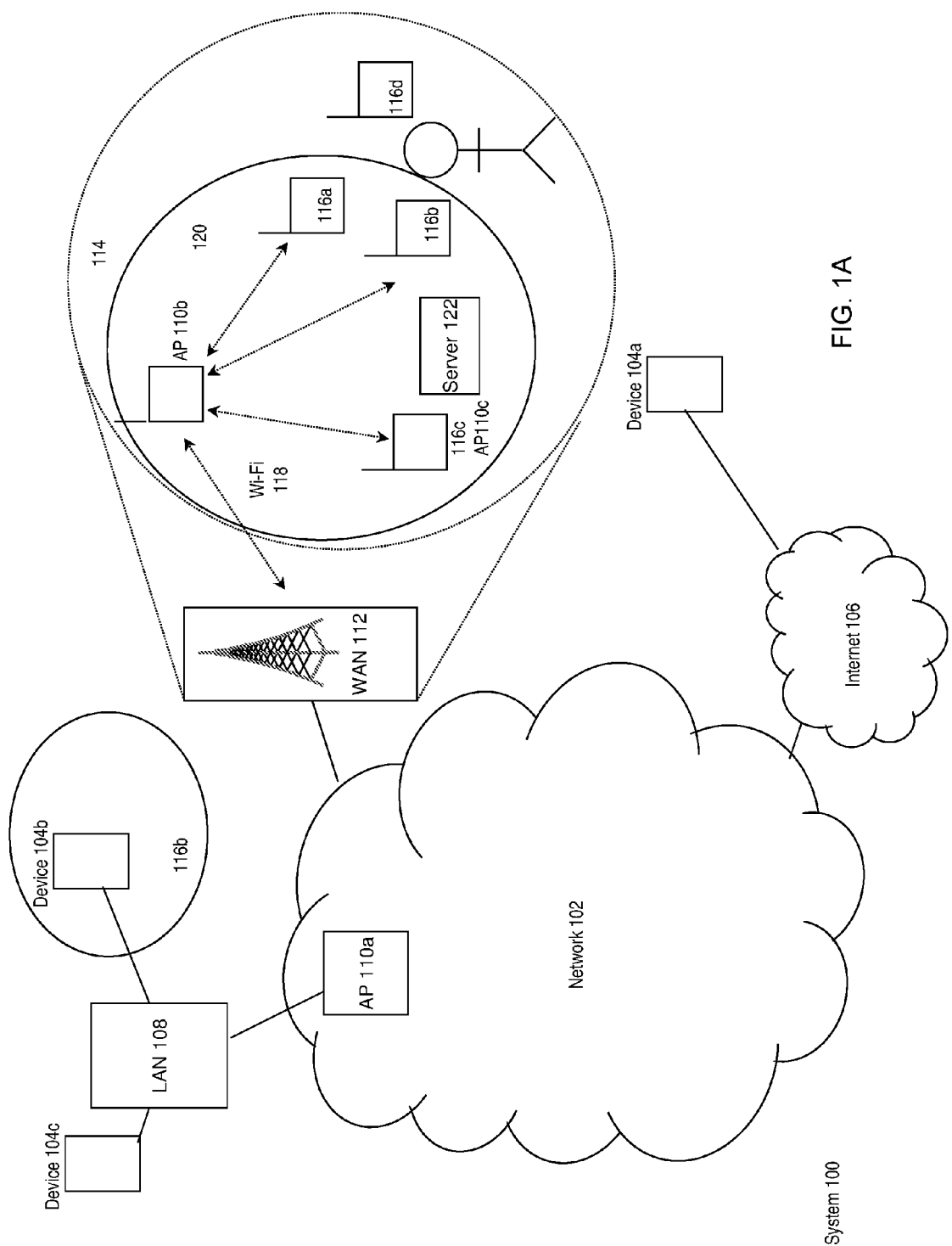
FIG. 1A is a schematic diagram of a communication system including a wireless communication network having an access point communicating with a communication device according to an embodiment.

Exemplary details of embodiments are provided herein. The description that follows and the embodiments described therein are provided by way of illustration of an example or examples of particular embodiments of principles of the present disclosure. These examples are provided for the purposes of explanation and not limitation of those principles and of the disclosure. In the description that follows like parts are marked throughout the specification and the drawings with the same respective reference numerals.

Briefly, an embodiment provides systems, methods, processes and devices for controlling how and when a communication device scans for a connection request to a "server" in a communication network. An exemplary communication network is a wireless network having a wireless transceiver acting as an access point (AP) for the network that communicates with wireless devices in the transmission area of the network. The transceiver generates through its antenna a transmission area for sending and receiving wireless transmissions. In particular, for the communication device, an embodiment will vary how often and when it scans for a network connection with an AP in the associated network. By varying the frequency (increasing or decreasing) of scans at selected times and other parameters, the communication device makes more intelligent scans for APs, thereby reduce battery usage by increasing the efficiency of such scans.

In a first aspect, a method of initiating scans for a network by a communication device for a communication network is provided. The method comprises: monitoring for a first condition relating to a network scan for the communication network; and when the first condition relates to a receipt of at least one request to initiate the network scan and when at least the first condition is satisfied, identifying a first parameter for the network scan and configuring and initiating the network scan at the communication device for the communication network implementing the first parameter.

In the method, the network may be an IEEE 802.11 class network; and the first parameter may indicate how frequently the network scan is conducted.

In the method, the network scan may be made for a duration indicated by a second parameter.

In the method, the request to initiate the network scan may be provided from an application operating on the communication device; and the first condition may further include that the receipt of at least one request is received within a time period. In the method, when the request is not received within the time period, the first condition may not be satisfied.

In the method, the first condition may further include that a previous network scan has not been initiated by the communication device within a second time period.

In the method, the network scan may be implemented with the first parameter when the first condition and a second condition relating a battery level of the communication device are satisfied.

In the method, the network scan may be implemented with the first parameter when the first condition and a second condition comprising detection of movement of the communication device are satisfied.

In the method, the second condition may comprise detection of movement of the communication device from a first jurisdiction to a second jurisdiction.

In the method, in the first jurisdiction, the communication network may utilize available white space in a first frequency spectrum in a defined frequency band; and in the second jurisdiction, the communication network may utilize a second frequency spectrum in the defined frequency band.

The method may further comprise: monitoring for a stop condition to stop the network scan; and when the stop condition is satisfied, terminating network scan. The method may still further comprise: after the stop condition is satisfied, monitoring for a second condition to recommence the network scan for the communication network; and when the second condition is satisfied, recommencing the network scan.

The method may further comprise when the first condition relates to detection of movement of the communication device at least a predetermined distance from its previous location and when at least the first condition is satisfied, identifying a first parameter for the network scan and configuring and initiating the network scan at the communication device for the communication network implementing the first parameter.

In the method, the communication device may utilize a part of a frequency spectrum that is in a white space of frequencies for television signal transmissions.

In the method, the first parameter for the network scan may be an aggregation of scan parameters received from all requests.

In the method, the first parameter for the network scan may be aggregation of scan parameters received from all of the at least one request; and the first condition may further include that a previous network scan has not been initiated by the communication device within a second time period.

In the method, the network scan may be part of a script of a plurality of network scans that is executed by the communication device.

In the method, the first parameter for the network scan may be provided in a scan profile associated with the communication device.

In a second aspect, a method of initiating scans for a network by a communication device for a communication network is provided. The method comprises: receiving a plurality of requests from at least one application operating on the communication device relating to network scan requests for the communication network; identify an amalgamated set of parameters for a network scan from the plurality of requests; and when at least one request from the plurality of requests has been received within a predetermined time period and when a previous network scan has not been initiated from at least a first period of time, configuring and initiating a network scan request that includes the amalgamated set of parameters.

In a third aspect, a system for initiating scans for a network in a communication device for a communication network is provided. The system comprises: a processor; a memory module for storing instructions for execution on the processor; and a monitoring module for providing instructions for execution on the processor. The instructions in the monitoring module are to: monitor for a first condition relating to a network scan for the communication network; and when the first condition relates to a receipt of at least one request to initiate the network scan and when at least the first condition is satisfied, identify a first parameter for the network scan and configure and initiate the network scan at the communication device for the communication network implementing the first parameter.

In the system, the network may be an IEEE 802.11 class network; the first parameter may indicate how frequently the network scan is conducted; the network scan may be made for a duration indicated by a second parameter; the request to initiate the network scan may be provided from an application operating on the communication device; and the first condition may further include that the receipt of at least one request is received within a time period.

In the system, the network scan may be implemented with the first parameter when the first condition and a second condition comprising detection of movement of the communication device from a first jurisdiction to a second jurisdiction are satisfied; in the first jurisdiction, the communication network may utilize available white space in a first frequency spectrum in a defined frequency band; and in the second jurisdiction, the communication network may utilize a second frequency spectrum in the defined frequency band.

In other aspects, various combinations of sets and subsets of the above aspects are provided.

First, details are provided on an embodiment and its network management features. In one configuration for the network, a transceiver and devices in the network have a "server/client" relationship, where the transceiver is a "server" device for the network and the devices are the "clients". In some networks, the server may be a fixed device, such as a wireless router directly connected to a physical wired Ethernet port in a network. The server operates as a node for the network and channels communications from the client devices destined for other devices in the network (or other networks). Other networks may have a non-fixed server, such as a wireless device. As such, a server may refer to a server that may be: in the same network as the client; located somewhere else in another network (such as in the Internet); or another device that is also in the same network. For the purposes of convenience, and not limitation, the term "fixed" is used herein to describe a device that typically is not mobile, typically has a physical connection to its network (e.g. through an Ethernet port) and typically is powered by a power connection to a utility network (through a power cord). The term "non-fixed" is used herein to describe a device that typically is mobile, typically makes a wireless connection to its network and other devices and typically is powered by a self-contained power source (e.g. through a battery). The terms "server/clients" refer generally to devices that are related in some hierarchical manner (e.g. with a designated parent) or non-hierarchical network (e.g. in a peer-to-peer network). Other terms may be used to describe comparable device relationships for an embodiment, such as "master/slave", "network node/client", "access point/clients", "AP/nodes", etc.

Generally, an embodiment provides a system and method for controlling parameters as to how often and/or how a communication device monitors for a network connection from a server in a communication network. In particular, an interface is provided in an embodiment for a communication device to manage how and when the monitoring is implemented. The interface is provided in one embodiment in an application program interface (API) that resides on the device. Applications operating on the device (e.g. email/calendar applications, location-based applications and others) may need to have a network connection to provide their full functionalities. In a portable communication device, a network connection may not be permanent. As such, an application may periodically need to ensure that the network connection is still presently available to it. When multiple applications make such network scans (or connection requests), there may be redundant and/or out-of-date requests. As such, the API of an embodiment provides a central interface to receive, process and aggregate the scan requests and determine when to initiate a network scan and using what parameters, based on the past scans and other factors, such as the location of the device.

Before discussing details on specific features of an embodiment, a description is provided on a network having a device, as a server, that provides connections to other devices, as clients, according to an embodiment. Then, details are provided on an exemplary device in which an embodiment operates.

Figure 1B:
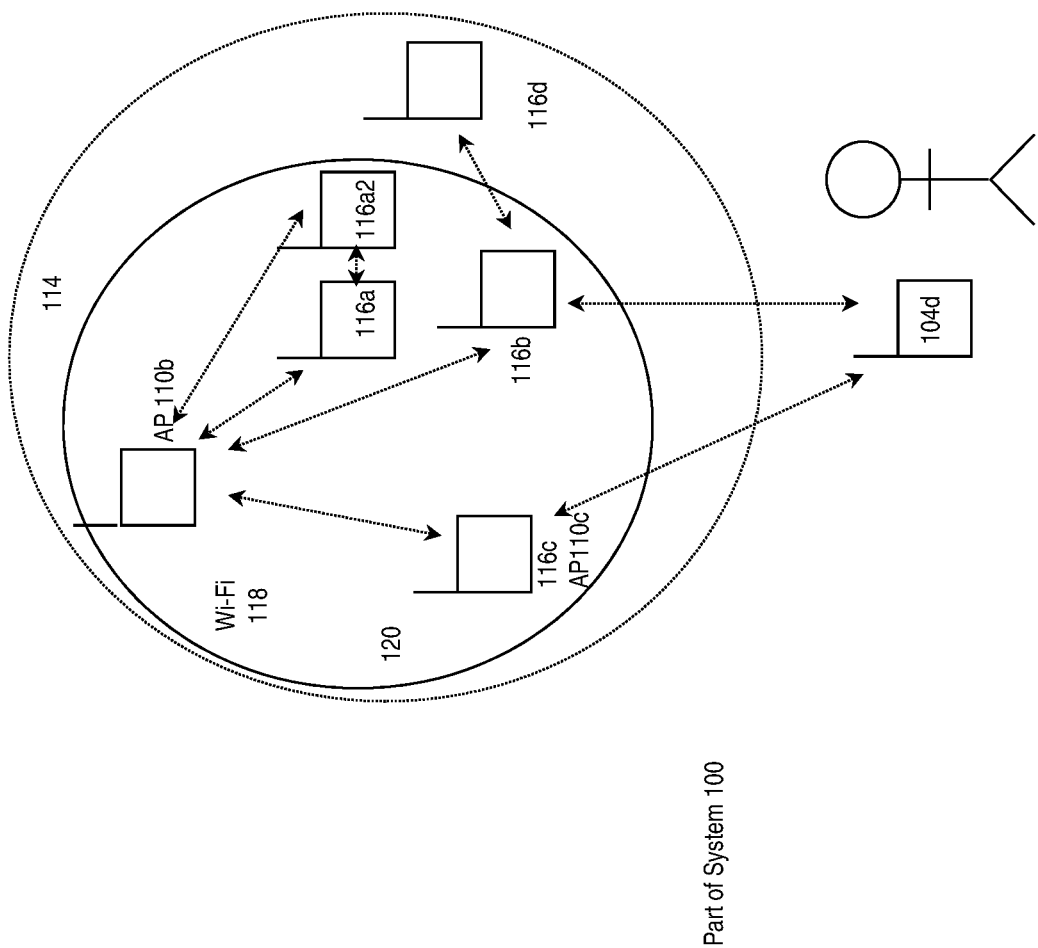
FIG. 1B is schematic diagram of a part of the communication system of FIG. 1A according to an embodiment.

First, details are provided on exemplary networks where devices according to an embodiment may operate. Referring to FIGS. 1A and 1B, details on a system of exemplary networks and communication devices according to an embodiment are provided. FIGS. 1A and 1B show communication system 100 where network 102 provides access to a suite of applications, services and data to its connected devices 104a-d (and other devices) through its associated servers. Network 102 may be implemented in any known architecture, providing wired and/or wireless connections to its elements. It will be appreciated that in other embodiments, various networks and subnetworks as described herein may be incorporated into other networks.

Internet 106 may be connected to network 102 providing a connection for device 104a to network 102. Local area network (LAN) 108 is connected to network 102 and provides local wired and wireless connections to its devices 104b and 104c. AP 110a provides a connection within network 102 to LAN 108.

An exemplary wide area network (WAN) 112 is connected to network 102 and provides wireless communication coverage to devices that are located within the wireless transmission area of the WAN 112. In FIG. 1A, WAN 112 has a transmission area defined schematically by circle 114. Wireless devices 116a-d have wireless communication capabilities with one or more wireless networks (described later). WAN 112 may have multiple transmission areas by having multiple communication towers. WAN 112 may be provided by a cellular communications company, such as Verizon (trade-mark).

Wireless devices 116a-d communicate through the data link layer in WAN 112. In an exemplary environment, WAN 112 is a local, geographically small, wireless network. Wireless devices 116a-d include handheld devices, cell phones and computers (either desktop or portable) having a (wireless) network card, network adapter and/or network interface controller ("NIC") installed therein.

Network 118 in one embodiment is a Wi-Fi network (referred to hereinafter as W-Fi network 118) that generally follows standards set by the IEEE LAN/MAN Standards Committee, known as IEEE 802, through its working group "11". The IEEE 802.11 standard defines media access control (MAC) and physical (PHY) layers in the OSI protocol model for a wireless local area network (WLAN). A Wi-Fi network is one type of WLAN. Currently, the family of IEEE 802.11 amendments encompass six wireless modulation techniques that all use the same communication protocol among their communicating elements. Other modulation techniques may be used. Current versions of IEEE 802.11 networks include: IEEE 802.11a, b, g and n, representing PHY amendments to IEEE 802.11. The IEEE 802.11 working group defines numerous distinct frequency ranges for transmission frequencies, e.g. so-called "white spaces" of the VHF/UHF television transmission bands (namely frequencies that are unused or underutilized geographically or temporally as specified in a geo-location database or its proxy server), 2.4 GHz, 3.6 GHz, 4.9 GHz, 5.0-6.0 GHz bands and other bands. Each frequency range is divided into a multitude of channels. Communications can be specified to be carried on a particular channel for a particular band. Specific transmission details and parameters of these networks and channels are known to those of skill in the art. For example, typical parameters required for a scan API are following: type (active or passive), SSID (the SSID is being sought, which may be a wildcard), Heterogeneous Extended SSID (HESSID) an IEEE 802.11u identifier, channel list (in a band or across bands); dwell time (a minimum amount of time to wait on the channel for a Beacon or Probe Response frame); and others as provided by IEEE 802.11-2012 specifications.

For an IEEE 802.11 network, a "station" is a basic component in the network. A station is any device that implements the functionality of an IEEE 802.11 protocol. It may (or may not) have a connection to a WLAN infrastructure. By convention generally, a STA is an integral part of a WLAN. Typically, the IEEE 802.11 connection and communication functions are implemented in hardware and software and may be provided in a network connection circuit or system in a NIC at the station. A station may be any device, including a laptop computer, device 104, wireless device 116a-d or AP 110. By convention, the term station is used for a mobile device and a station is understood to support the IEEE 802.11 station services of authentication, de-authentication, privacy and data delivery. For the purposes of an embodiment as it relates to IEEE 802.11 standards, devices 116 may be considered to be stations. However, for an embodiment, other devices, such as non-wireless devices, devices having a fixed communication link to a network and other devices may incorporate features of wireless devices 116.a-d A service set (SS) is defined as all devices (or stations) associated with a specific local or enterprise IEEE 802.11 wireless LAN(s). A service set identifier (SSID) is a unique 32-character network name, or identifier, that is created and associated with a particular WLAN 112. A basic service set (BSS) is defined a single access point with all its associated stations. An Extended Service Set (ESS) is a set of one or more interconnected basic service sets and associated local area networks.

An IEEE 802.11 network may be implemented in one of many network modes. An "ad hoc" IEEE 802.11 mode allows devices to operate in an independent basic service set (IBSS) network configuration. With an IBSS, there are no access points. Clients in a network communicate directly with each other in a peer-to-peer manner.

One ad hoc network follows the Wi-Fi Alliance's Peer-to-Peer (P2P) Technical Specification, as defined by the Wi-Fi Alliance Technical Committee P2P Task Group. In an exemplary P2P group, a set of P2P devices communicate with each other. A P2P device may function as a P2P group owner (namely as an administrator) and/or a P2P client; may conduct negotiations to assume a P2P group owner role or P2P client role; may provide network configuration (such as Wi-Fi Simple Configuration or WSC) and network discovery operations; and may support WLAN and P2P concurrent operations. A P2P group owner may provide "AP-like" roles of BSS functionality and services for associated clients in the network (for example P2P clients or legacy clients); may provide network configuration registrar functionality; may provide communication with associated clients; and may provide access to a simultaneous WLAN connection for its associated clients. A P2P client may implement non-AP STA functionality; and may provide WSC enrollee functionality. A P2P device may be configured to provide communications to other P2P devices in a P2P group and to also concurrently operate with a WLAN. AP 110 may provide communications to other P2P devices in a P2P group in Wi-Fi network 118 and to also concurrently operate with a WAN 112.

W-Fi network 118 has AP 110b, which supports radio transmission equipment known to those skilled in the art. AP 110b is a communication device that contains an IEEE 802.11 radio receiver/transmitter (or transceiver) and functions as a bridge between WAN 112 and other networks (such as network 102, Internet 106 and/or LAN 108) for its carried communications. As such, AP 110b establishes W-Fi network 118 which happens to be operating within WAN 112. W-Fi network 118 has a transmission area denoted by circle 120 and covers wireless devices 116a-c. Wireless device 116d is shown as being inside WAN 112 and its transmission area 114, but outside the transmission area 120 for the W-Fi network 118 surrounding AP 110b. Bi-directional arrows connecting AP 110b to wireless devices 116a-c show individual communication links established for those devices to AP 110b. AP 110b provides data distribution services among wireless devices 116a-c within transmission area 120 under W-Fi network 118 simultaneously with communications provided by WAN 112. AP 110b may be a non-fixed wireless device and as such AP 110b is effectively another wireless device 116. "Hotspot" functionalities for AP 110b may be provided in wireless devices 116a-d. For example, wireless device 116c may have capabilities to be another W-Fi hotspot host and operate as AP 110c. As AP 110b is the data distribution point for its W-Fi network 118, it will be seen that the transmission area 120 is focussed around AP 110b. In one example, as AP 110b moves (as it is a non-fixed device), its transmission area 120 will move with it. A more likely example is that AP 110b is at a fixed location. Generally, it will be the case that wireless devices 116a-d move and AP 110b is fixed. It will be seen that an AP is one form of a server device and that wireless devices 116a-d are one form of client devices for a network. Other devices may be provided in the client/server relationship.

Further detail is now provided on messages generated and sent between elements in Wi-Fi network 118. In an IEEE 802.11-class network, messages are sent between its AP 110b and its communicating wireless devices 116a-d in data transmissions called frames. Most frames are sent and processed in a "send-and-respond" protocol. As such a frame may be sent by an AP 110b to one or more wireless devices 116a-d. When a device receives a frame, it extracts data from the frame and then it may generate a response. A similar communication dialog may be initiated by a LAN 108 to AP 110a. Note that broadcast frames sent by an AP 110a-d are not acknowledged by wireless devices 116a-d. There are several classes of frames including control, management and data. Control frames assist in delivering data frames between stations. Management frames facilitate connection establishment and maintenance between a device 116a-d and AP 110b. In particular, management frames have at least the following uses: they allow a device to be associated, disassociated and re-associated to a network; they allow the device to be associated with a network; and they allow a device to initiate a probe request to an AP to request information about another device in a network. Frames may include additional information, such as source and destination MAC addresses, a control field that provides information on the IEEE 802.11 protocol version, frame type and other status indicators. It will be appreciated that a person of skill in the art has knowledge of the protocols of the frames. Additional materials relating to same are provided in published IEEE 802.11 Working Group materials.

A beacon frame is a type of a management frame that is periodically broadcast by an AP 110b to provide a signal of its presence to the communication boundaries of its network. The typical period of transmission of a beacon frame is about every 100 ms. The current IEEE 802.11 standards set the period to be 102.4 ms. It will be appreciated that there will be an acceptable variance in the exact period used in an embodiment, which may be in the range of approximately 15% or more from the standard period. The body of a beacon frame contains: a beacon interval, providing the amount of time between beacon transmissions; a timestamp, which may be used by a station to synchronize itself and update its local clock; and the SSID of W-Fi network 118 of AP 110b. The beacon frame can also provide: data indicating the supported transmission rates of the WLAN; data regarding the signalling parameters of the WLAN, such as frequency hopping spread spectrum, direct sequence spread spectrum, etc.; data on the capabilities of the WLAN; and data providing a traffic indication map (TIM). The beacon frame includes a frame header and cyclic redundancy checking (CRC) field. The destination address of the frame is set to all 1's, which is the broadcast MAC address. This will cause all other stations on the applicable channel to process a received beacon frame. The beacon frame may also contain a Delivery TIM (DTIM) which is a flag indicating whether any buffered broadcast or multicast traffic is going to be transmitted from the AP 110b to wireless devices 116a-d immediately (or shortly) after the beacon signal.

A beacon frame is used as a synchronizing signal for transmitting broadcast and multicast traffic to devices in the associated network. Immediately following the beacon frame, if broadcast or multicast traffic is queued to be provided, such traffic is transmitted by AP 110b through its Wi-Fi network 118. Multicast traffic is queued for transmission by AP 110b only if its requested recipient wireless device 116a-d has positively responded to an early request by AP 110b to transmit that multicast traffic to it. Broadcast traffic is broadcast to the wireless devices 116a-d without any request signal sent by AP 110b. The broadcast or multicast traffic can contain data from other layers in the communication network, such as the IP layer.

For wireless device 116a to maintain/establish communications with AP 110b (and its related W-Fi network 118), wireless device 116a may need to receive and respond to a beacon frame sent from AP 110b. Under Wi-Fi constructs, wireless device 116a can initiate an active scan or a passive scan to scan for beacon frames. For an active scan, wireless device 116a broadcasts a probe request frame on a channel for each AP that it is attempting to locate. For a passive scan, wireless device 116a does not send a probe request frame; instead, wireless device 116a dwells on a channel for a period of time and monitors for receipt of either a probe response or beacon frames from the AP it is attempting to locate. When actively or passively scanning, wireless device 116a needs to dwell on the channel for a period of time that is long enough to potentially receive a probe response or beacon frames from a SSID that it is trying to locate. The dwell period depends on a hardware vendor's implementation for wireless device 116a and the scanning method used. Also, when a maximum dwell period is reached, by one convention the station is required to start a scan on another channel. If wireless device 116a is conducting an active scan, it should send probe request frames only on the valid channels for the regulatory domain where it is currently operating. For some situations, wireless device 116a may passively scan on channels outside of the regulatory domain. When a beacon frame is received, wireless device 116a can analyze it to determine characteristics of the related network and then wireless device 116a can determine whether is wishes to associate itself with that network. To be associated with a network, wireless device 116a would send authentication request and association request frames to the AP associated with the selected network.

As noted earlier, AP 110b will periodically send broadcast/multicast packets that can be received by wireless device 116a at intervals determined, in part, by the value of the DTIM field. As such, wireless device 116a, it must be synchronized such that wireless device 116a is able to receive and respond to such beacon signals and receive, as required, the broadcast/multicast traffic that proceeds them.

Server 122 provides services and support for devices and networks connected to it. Server 122 is shown in Wi-Fi network 118, but can communicate with WAN 112 and network 102. Local servers, providing comparable functions as server 122 may be provided in WAN 112 and network 102. Server 122 provides services for devices in Wi-Fi network 118. Server 122 may provide maintenance functions for communication links among devices in network 118. In some embodiments, for W-Fi network 118, features of server 122 may be provided by AP 110a and vice versa.

Since wireless AP 110b is portable, it may move. As well, its wireless devices 116a-d may move relative to it. As such, for Wi-Fi network 118 and AP 110b, transmission area 120 and wireless devices 116a-d therein dynamically change, with the quality of the communication link provided for an area ranging from non-existent, to poor, to adequate, to good and to excellent (with values in-between). Several characteristics of the communication link may determine its quality, such as the strength of the RF signal in the link, any error correction procedures conducted for the link, any redundant transmissions made for communications over the link, and others. Additionally, use of the current communication link and its frequencies may be subject to restrictions for wireless device 116a. For example wireless device 116a may be operating under control of a geo-location database or a database proxy server and wireless device 116a may be obligated to rescan for a network once it has moved the distance limit specified by a related regulatory domain of operation. This situation may occur when wireless device 116a is using frequencies in television-band white spaces in certain jurisdictions.

Figure 2:
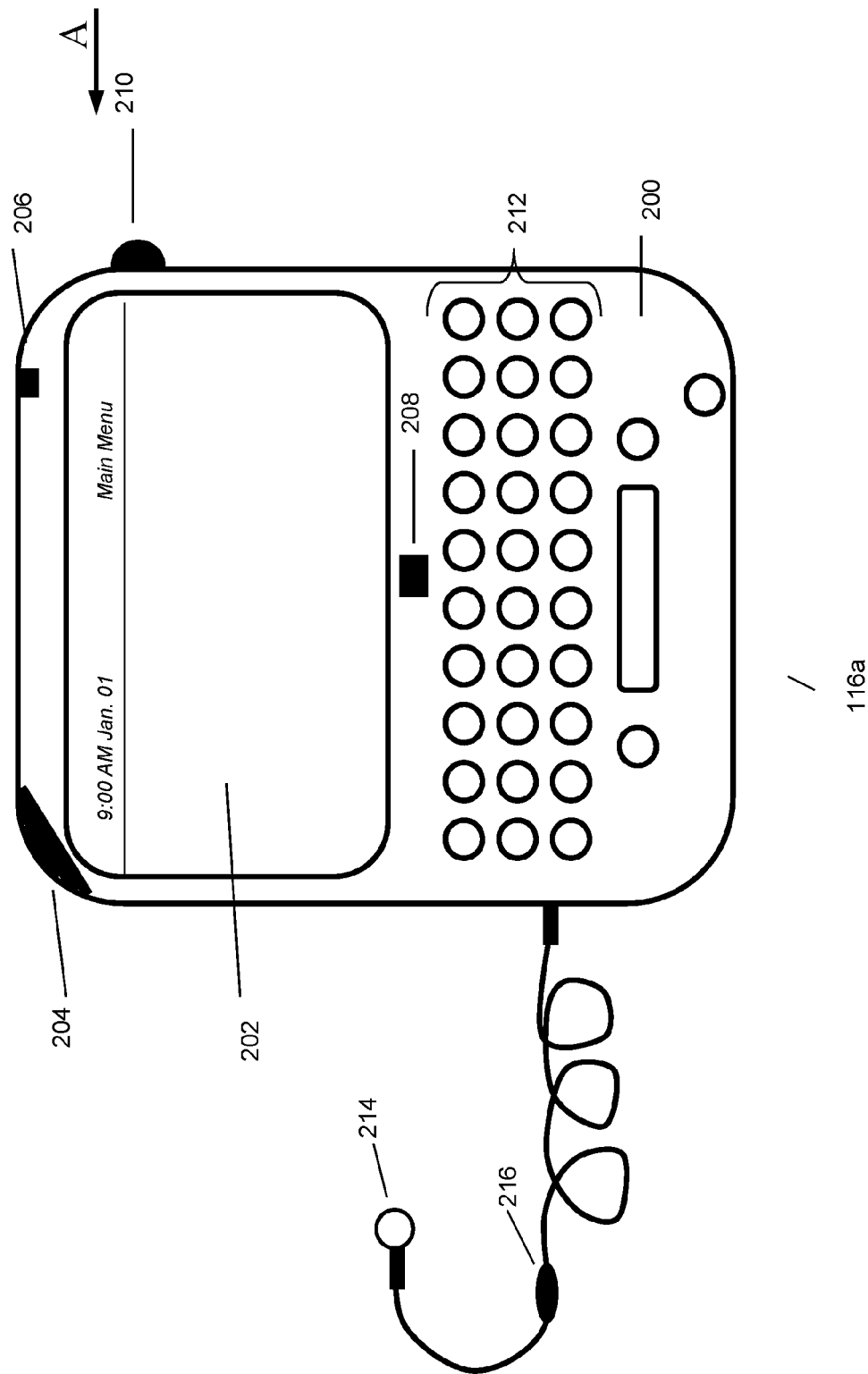
FIG. 2 is a schematic representation of the communication device of FIG. 1A according to an embodiment.

Now, details are provided on an exemplary device according to an embodiment. FIG. 2 provides general features of wireless device 116a in accordance with an embodiment of the disclosure. These features may also be present in AP 110b and devices 104a-d.

In the present embodiment, wireless device 116a is based on a computing platform having functionality of an enhanced personal digital assistant with cellphone and e-mail features. Wireless device 116a is a processor-controlled device (not shown). Software applications operating on wireless device 116a control its operations and network connections to implement the above-noted three features. Further detail on selected applications for an embodiment is provided later. It is understood that wireless device 116a may be based on construction design and functionality of other electronic devices, such as smart telephones, desktop computers, pagers or laptops having telephony equipment. In a present embodiment, wireless device 116a includes a housing 200, an LCD 202, speaker 204, an LED indicator 206, an input device 208 (which may be a trackpad, trackball, thumbwheel or other input device), an ESC ("escape") key 210, keypad 212, a telephone headset comprised of an ear bud 214 and a microphone 216. ESC key 210 may be inwardly depressed along the path of arrow "A" as a means to provide additional input to wireless device 116a. It will be understood that housing 200 may be made from any suitable material as will occur to those of skill in the art and may be suitably formed to house and hold all components of wireless device 116a.

Wireless device 116a is operable to conduct wireless telephone calls, using any wireless phone system. Exemplary technologies are any known wireless phone systems such as a Mobitex (trade-mark) network, a DataTAC (trade-mark) network, a General Packet Radio Service (GPRS) network and also a variety of data and voice communication networks, such as Advanced Mobile Phone Service (AMPS), Time Division Multiple Access (TDMA), Code Division Multiple Access (CDMA) system, wireless CDMA, CDMA 2000 system, Cellular Digital Packet Data (CDPD) system, Personal Communication Service (PCS), Global System for Mobile Communication (GSM), W-Fi networks, 3GPP Long Term Evolution (LTE) networks, etc. Other wireless phone systems that wireless device 116a may support may include Wireless WAN (IMS), Wireless MAN (W-Max or IEEE 802.16), Wireless LAN (IEEE 802.11), Wireless PAN (IEEE 802.15, Zigbee and Bluetooth), high-speed data packet access (HSDPA) networks, Evolved High Speed Packet Access (HSPA+) networks, etc. and any others that support voice and data. Additionally, a Bluetooth network may be supported. Other embodiments include Voice over IP (VoIP) type streaming data communications that may simulate circuit-switched phone calls. Wireless device 116a may have capabilities of communicating with other devices using other communication technologies, including instant messaging (IM) systems, text messaging (TM) systems and short message service (SMS) systems. Ear bud 214 may be used to listen to phone calls and other sound messages and microphone 216 may be used to speak into and input sound messages to wireless device 116a.

Wireless device 116a may operate as a dual-mode modem. Its mobile data communication functions allow it to make WAN connections and allow it to deliver voice and emails to user of wireless device 116a. Overall throughput between AP 110b and wireless device 116a may depend on an instantaneous wireless signal quality of two PHY layers, namely a Physical Coding Sublayer (PCS) and a Physical Medium Dependent (PMD) layer. The PCS encodes and decodes the data that is transmitted and received.

Wireless device 116a may have modules to provide near field communication (NFC), allowing it to communicate wirelessly with another device when the two devices are placed in very close proximity to each other. NFC technologies are an extension of the ISO 14443 proximity-card standard as a contactless card, Radio Frequency Identification (RFID) standard that incorporates the interface of a smart card and a reader into one device. A NFC-enabled device, such as wireless device 116a, typically includes an NFC integrated circuit (IC) that communicates to such devices as existing ISO 14443 smart cards and readers and other NFC devices and compatible with any existing contactless infrastructure. The NFC ICs may magnetic field induction where two loop antennas are located near each other and form an air-core transformer. The NFC technology operates on an unlicensed radio frequency ISM band of about 13.56 MHz and has a bandwidth of about 2 MHz. The working distance for the two devices is usually about between 0 and 20 centimetres. In use, a user of a first NFC device brings it close to another NFC enabled device or tag to initiate NFC communication. NFC data rates range from about 106 to 424 kbit/s.

Now, details are provided on an embodiment and processes to adjust parameters of network scans for network connections. As noted earlier, in a W-Fi network beacon frames are transmitted from an AP at a frequency of approximately once every 102.4 ms under current IEEE 802.11 constructs. Wireless 116a may scan for a beacon frame on one or more channels at set intervals. Scans can be passive or active: passive scans entail monitoring for receipt of a beacon frame for a channel for a given period of time; active scans additionally entail sending a probe request frame on a channel. In monitoring for a beacon frame, wireless device 116a monitors a channel of a Wi-Fi connection for a set scanning time in a scanning period.

One parameter that can be adjusted is the frequency of network scans, i.e. a network scan will be conducted once every X seconds. A scanning frequency can be set, in part, based on the status of network connections detected by wireless device 116a. For example, wireless device 116a may be: i) not connected to a network; ii) connected to a network; or iii) connected to multiple networks in different frequency bands (for example, wireless device 116a may have a Wi-Fi Direct/P2P connection with a connection to an AP infrastructure network). For situation i), wireless device 116a may wish to make occasional, but not overly frequent, scans for network connection(s), such as for example, scanning for networks for a scan time of approximately 30 ms approximately once every 60 seconds. For situation ii), wireless device 116a may wish to simply rely on the established network connection and so it may not initiate any scans for network connection(s). For situation iii), wireless device 116a may wish to ensure that it has more current network connection information, so it may make more frequent scans for network connection(s), such as for example, scanning for networks for a certain scan time approximately once every 10 seconds. It will be appreciated that the scan times and scan periods stated (e.g. 60 s and 10 s) may be changed for different conditions.

To have timely information from networks and as such to be responsive to timely connection requests, an embodiment may control and moderate network scan requests based on one or more conditions detected by or evaluated by wireless device 116a and/or requests received from application(s) operating on wireless device 116a. It will be seen that if multiple applications each initiate a separate number of network scan requests, then wireless device 116a may receive multiple-multiple communication network scan requests for processing. Some of these multiple-multiple requests may be redundant. If a scan request was initiated for each of the requests, then the net set of scan requests may be making requests that are overly frequent for the needs of wireless device 116a. As such, an embodiment can filter the requests and identify an aggregate scan that can be provided to replace at least a subset of the received scan requests. Further, with an embodiment, if wireless device 116a is moving and/or if applications operating on wireless device 116a makes frequent network scan requests, then an embodiment can receive and analyze these conditions and streamline the scans to reduce unnecessary scans (e.g. requests that are too soon since a last request or eliminate scans of irrelevant channels). In certain circumstances, scans may be increased and concentrated over a "normal" scan rate, if deemed necessary. For an embodiment, if multiple applications issue scan requests, an embodiment can identify and aggregate scan requests where possible so that multiple scan requests can be reduced to fewer scan operations (and in one embodiment reduced to one scan operation).

To control and manage connection requests, an embodiment provides an interface for wireless device 116a (or other devices) that performs one or more of the following functions: analyzes operating conditions of wireless device 116a; receives network scan requests; adjusts, if necessary, one or more parameters for network scans, including aggregating parameters into a single scan; and initiates a network scan with the parameters based on conditions determined by device 116a. Further details are provided on two features of an embodiment in managing network scan requests from applications operating on wireless device 116a. A first feature is identifying and controlling parameters of how (and when) wireless device 116a conducts network scans. A second feature is determining conditions for when network scan are to be conducted (using the parameters as set). Each feature is discussed in turn.

For the first feature, an embodiment can moderate one or more parameters of a network scan. Table A provides a non-exhaustive list of exemplary parameters that wireless device 116a may set when a request for a network scan is initiated.

TABLE A

| Parameter | Notes |
| --- | --- |
| Scan Type | Active scan or passive scan |
| Scan Time | The scan time sets a length of time that wireless device 116a would dwell on a channel and monitor for a beacon frame. The scan time may instead by the total time that the device dwells on its monitored channels. During the scan time, the monitoring may be continual. One embodiment may set the scan time to be approximately 30 ms. Other scan times can be used. This is a similar concept to dwell time, noted below. |
| Scan Period | The scan period sets a period of time in which wireless device 116a would conduct a network scan (for the noted scan time). During the scan period, wireless device 116a would scan for a network (as noted above) for the scan time. One embodiment may set the scan period to be approximately 2 s (seconds). Other scan periods can be used. As such, if the scan time is 30 ms, then once every 2 s, device 116a would scan for network connections for 30 ms. In one embodiment, the 30 ms of scans is conducted in a continuous time window in the 2 s period. The start time of the scanning in the period can be anywhere in the period and it may shift over time. In other embodiments, 30 ms of scans may be conducted in distinct slots in the 2 s period. The scan period can be changed. After the 2 s period is completed, a next scan for 30 ms is conducted in the next 2 s period. The scan period may refer to the time period in which device 116a would conduct a scan on one channel or the period of time it would conduct scans for multiple channels. In the case of geo-location dependent operations, a scan time may be set according to a velocity of device 116a, as it relates to the regulatory domain limits |
| Scan Frequency | The scan frequency would be the corollary to the scan period, where Scan frequency = 1/scan period As with the scan period, the scan frequency may refer to frequency that wireless device 116a would conduct a scan on one channel or the frequency that it would conduct scans for multiple channels. |
| Scan Interval | As an alternative to a scan period, the scan interval sets a period of time between scan times. As such, the scan time and the scan interval together set the scan period. As with the scan period, the scan interval may refer to interval between times that wireless device 116a would conduct a scan on one channel or the intervals between times that it would conduct scans for multiple channels. |
| Min. Dwell time | Minimum time to dwell on a channel to monitor for a beacon frame. Dwell times can vary for different channels. |
| Max. Dwell time | Maximum time to dwell on a channel to monitor for a beacon frame. Dwell times can vary for different channels. |
| Number of Scans | Sets a maximum/minimum number of scan cycles to be conducted |
| Channel List | Lists the channel(s) to be scanned. For example, for Wi-Fi communications in the 2.4 GHz band, channels 1, 6 and 11 can be deemed to be scanned. Channels may be |

TABLE A-continued

| Parameter | Notes |
| --- | --- |
|  | skipped. A roster of channels may be sequentially scanned. Other permutations on which channels and when they are scanned may be provided. WLAN master devices operating under the control of a geo-location database or a proxy server of the database may be required to contact the database or proxy server for the list of channels that may be scanned. Then wireless device 116a may a list of scannable channels from the master devices. |
| Data Rate used for Scan | The data rate used to scan can be set. For example, for IEEE 802.11g communications, the data rate can be set to 54 Mbps, but any permissible IEEE 802.11 a, b, g, n, ac, ad, ah or as data rate (or others) may be used. The data rate may be changed during operation of an embodiment based on trigger conditions or detected events. |
| Power of communication signal carrying scan request | The power of the communication signals carrying the scan requests can be set. |
| Probes for active scans | A maximum number of probes for active scanning may be set as some WLAN chipsets allow a device to send more than one probe request when the device scans a channel. |

Some of these parameters represent different settings that relate to similar concepts, with different flexibilities (e.g. the scan time may be expressed in minimum and maximum scan/dwell times). It will be seen that the scan frequency and scan period relate to the same concept—how often scans are conducted. Generally, it will be seen that the term "scan" (as in scan time) refers to scans conducted on one or more channels, while the term "dwell" (as in dwell time) refers to one a type of scan, namely a scan conducted on a single channel. For convenience, and not for limitation, where the term "scan" is used herein, it will be understood to include features of a scan (for one or more channels) and features of a dwell (for a single channel) unless otherwise noted. The term "dwell" will be understood to be a specific example of a "scan". For an embodiment, typically, the length of the scan is set to be in the order of a few seconds or less (e.g. approximately 5 seconds or less) and the scan period is set to be in the order of many seconds or minutes (e.g. approximately 30 seconds, 60 seconds, 1 minute, 2 minutes or more).

It will be appreciated that the above noted one or more parameters may be changed from according to a program or script, where several discrete changes are made on the scan parameters as sequential scans are conducted. For example, an exemplary program or script may have two settings for parameters. In the first setting, first the dwell time (for a single channel) is set to 30 ms, the scan period is set for 2 s for ten (10) periods and channel 1 is set to be scanned. Then after the 10 scan periods, for the second setting the dwell time is reduced to 5 s and for the next 10 periods, the channels scanned cycle among channels 1, 6 and 11. Other programs can be provided. It will further be appreciated that conditions may be imposed on when, how and if to change the above noted parameters.

For the second feature, an embodiment provides a gate-keeping function for initiating network scan requests. In one embodiment, requests from all or a selected set of applications are received by an embodiment and before any request is granted, the net set of received requests is be analyzed. From the requests, a global set of scan parameters can be set to address all (or a selected set) of the requests. An API operating on wireless device 116a can be provided to receive the requests from the applications. In other embodiments, an application may have the first feature built into its functionality. For the sake of convenience and not limitation, where the specification refers to an API, it will be understood that functions of the API may be incorporated into an application operating on wireless device 116a to provide the same local functions for as the API, but local to the application, unless otherwise noted. The API may be implemented as an interrupt routine that is executed on a processor of device 116a.

For part of the second feature, synchronization/triggering/filtering/aggregating of scan requests may be provided by the API (or other processes controlling the scan function) for the API/controlling function and the requesting application(s). For example, as a condition to initiate a network scan, the API may require that the application must send periodic scan request messages to the API, thereby operating as a series of "ping" messages sent from the application to the API. The API may or may not respond to the request messages. Synchronization/triggering/filtering/aggregation of parameters may be set and known by both the API and the application or a negotiation may be conducted between the API and the application to identity necessary actions that the application is expected to undertake to satisfy the API to initiate a network scan. In one embodiment, a pre-set synchronization scheme is that the application must send periodic messages to the API with its requests (e.g. one request approximately every 1-10 minutes). The request may include parameters for the network scan as requested by the application. If an expected request is not received in the expected timeframe, then the request may be ignored and no scan (or a different limited scan) may be conducted.

In operation in an embodiment an application in wireless device 116a issues periodic scan requests; a software driver in wireless device 116a receives and processes the requests and sets a timer; a software driver periodically scans and reports results to the application; if no subsequent scan requests or related trigger commands are detected by the driver before the timer expires, the device may stop scanning and/or may not conduct future scans.

For the second feature, additionally or alternatively, conditions detected by wireless device 116a relating to itself and/or conditions relating to network 118 or AP 116a may be used to initiate a network scan. Table B provides a non-exhaustive list of exemplary conditions that wireless device 116a may evaluate to trigger a network scan request.

TABLE B

Device related conditions

| Parameter | Condition | Notes |
| --- | --- | --- |
| Location/ movement of device | Change/no change of current location of device | If the current location of the device has changed/not changed since a last check, then a network scan may be requested/prohibited, depending on desired result. |
| Battery Level | Below Threshold | If the battery level of the device is below a prescribed threshold, then then a network scan may be requested/ prohibited depending on desired result. |
| Received Comm. Signal Strength | Below Threshold | If the received communication signal from the AP is below a prescribed threshold, then a network scan may be requested/prohibited depending on desired result. The signal strength may be expressed as a signal to noise ratio. |

TABLE B-continued

Device related conditions

| Parameter | Condition | Notes |
|---|---|---|
| Regulatory Requirements | Change in communication parameters | If the device is using a certain network in compliance with local regulatory requirements and there is a change in the device that would place the device out of compliance (e.g. moving device from its current location or from one jurisdiction to another jurisdiction), then a network scan may be requested. For example, moving of wireless device 116a of a relatively short distance, in some bands may then require a network scan to satisfy regulatory requirements. For example a movement of approximately 50 m or more when using television spectrum white spaces may trigger a rescan |
| Security Analysis | Below Threshold | If the level of security provided in the communication link to the network through the AP does not meet minimum requirements, then a network scan may be requested/prohibited. |
| Timeout Condition | Data Limit exceeded/ Timer expired | If a limit for communicating directly with the current AP is exceeded (e.g. time connected to AP, data transferred with AP, etc.) then a network scan may be requested/prohibited. |
| Proximity Conditions | Presence of another device is required to trigger a network scan | If a second device is detected to be near the device (e.g. via NFC communications), a scan may be initiated. Also, a Bluetooth operation may trigger a WLAN scan to set-up a Wi-Fi Direct connection. |

Initiation of a request to for a network scan may be set on any combination of conditions as noted in Table B, AP 110b, W-Fi network 118 and/or an external device (such as a server). One or more of the conditions may be evaluated, weighted and scored against a threshold to determine whether and when to make a network scan request.

Further detail is provided on aspects of the location condition used to determine when a connection request should be made. Applications operating on wireless device 116a may need to retrieve information from Wi-Fi network 118 only when wireless device 116a is moving (or has recently moved). If wireless device 116a has not moved for a minimum length of time, the application may not need to make a network scan request. However, once wireless device 116a moves a pre-set distance, there may be benefit to wireless device 116a making a network scan request as soon as possible. FIG. 1B shows wireless device 116a moving a pre-set distance within W-Fi network 118. In FIG. 1B, wireless device 116a is depicted as wireless device 116a2 after moving the pre-set distance.

There are several methods, techniques and data that can be used to determine when wireless device 116a has moved. For example a motion sensor/accelerometer/GPS device in wireless device 116a may provide signals that can be interpreted to indicate when wireless device 116a is moving or not moving. Upon detection of a sufficient movement of wireless device 116a (which may include determination of movement of wireless device 116a for a minimum distance or movement for a minimum amount of time) and satisfaction of any other conditions (for example, an application synchronization requirement noted earlier), then a network scan may be initiated. It will be seen that wireless device 116a may need to request a networks scan while it is moving for a variety of reasons, such as a change in the RF environment has occurred (e.g. relating to signal quality, frequency availabilities, etc., or regulatory requirements impose that a rescan is required when wireless device 116a has moved a predetermined distance, and other reasons.

Further detail is provided on aspects of the regulatory requirements as a condition noted in Table B. When wireless device 116a is in a location that is a recognized jurisdiction or zone (e.g. in a country, province, state, city, telephone area code zone, time zone, etc.), wireless device 116a may benefit from using certain networks/spectrums which may be available to it, due to a local communication agency's communication spectrum allocation policies for that jurisdiction. When the device moves, it may move out of the (first) jurisdiction and/or into another (second) jurisdiction, which may affect or change the regulatory rules that apply to communications for wireless device 116a. For example, when wireless device 116a is in Canada, one set of communication transmission rules may apply and when wireless device 116a moves to England, another set of transmission rules may apply. The transmission rules may define certain transmission frequency range(s) that are permissible for use, must be used and/or are impermissible for use. For example, a change may be mandated by regulations when wireless device 116a crosses a country border in Europe. As movements are dynamic, an embodiment can provide a filter or hysteresis algorithm to minimize switching backwards and forth among frequencies as wireless device 116a approaches or leaves a jurisdiction border.

Also, certain geographic locations may require and/or restrict frequency communications and/or impose certain communication protocols for wireless device 116a. For example, for a given country (e.g. European countries), there may be restrictions on using certain bands in the frequency spectrum (e.g. those that interfere with RADAR spectrums). As such, when the determined location is deemed to be in a European (EU) country, transmissions from AP may be limited to such frequency bands. As another example, for a given country code, restrictions can be provided to limit network scans to certain channels. This would have the effect of avoiding non-necessary channel scans, thereby saving transmission and power resources of wireless device 116a.

Further still, some jurisdictions allow transmissions to be carried on un-used portions of the transmission spectrum. For example, in certain jurisdictions (e.g. in Europe), unused transmission spectrum for white space television transmission bands (or other transmission bands) may be used. When a device has been detected to be in a certain jurisdiction that allows such white space in the frequency spectrum to be used, the device may be configured to establish communications using a first frequency spectrum in that white space. However, if the device moves from the first jurisdiction to a second jurisdiction (which may be simply outside boundaries of the first jurisdiction), the device may be required to use a network that utilizes a second frequency spectrum in that white space that generally is different that the first frequency spectrum. Other types of movement e.g. from an indoor environment to an outdoor environment or vice versa may trigger a change in the frequency spectrum to be used as well.

If wireless device 116a is in a jurisdiction that provides special access to the transmission spectrum and when wireless device 116a moves from that jurisdiction, a change in its network connection parameters may be needed. As such, the detection of movement of device 116a from a current jurisdiction and satisfaction of any other conditions (for example, the device synchronization requirement noted earlier), then a network scan may be initiated.

Further still, a movement of wireless device 116a from its current location (without a jurisdiction change) may be a sufficient condition to request a network scan. For example, as noted in Table B, a movement of device wireless 116a by a relatively small distance (e.g. 5, 10, 50 m more) from its current position may be a trigger to initiate a scan.

Further still, some jurisdictions allow transmissions to be carried on un-used portions of the transmission spectrum. For example, in certain jurisdictions (e.g. in Europe), unused transmission spectrum for white space television transmission bands (or other transmission bands) may be used. When a device has been detected to be in a certain jurisdiction that allows such white space in the frequency spectrum to be used, the device may be configured to establish communications using a first frequency spectrum in that white space. However, if the device moves from the first jurisdiction to a second jurisdiction (which may be simply outside boundaries of the first jurisdiction), the device may be required to use a network that utilizes a second frequency spectrum in that white space that generally is different that the first frequency spectrum. Other types of movement e.g. from an indoor environment to an outdoor environment or vice versa may trigger a change in the frequency spectrum to be used as well.

As noted, an embodiment can set one or more conditions that, when satisfied, causes wireless device 116a to initiate a network scan. It will be seen that the same conditions or different conditions can also be employed, so that when those conditions are satisfied, instead of initiating a network scan at wireless device 116a, a network scan is specifically prohibited. A network scan may be prohibited for a variety of reasons. For example, a network scan may be superfluous or may be not relevant to wireless device 116a. For example wireless device 116a may have determined through different mechanisms and/or information that a network connection is available to wireless device 116a, wireless device 116a may have moved from a jurisdiction that is not using the previously scanned network, device 116a may not have sufficient battery power/other resources to maintain a network connection and others.

With details of exemplary network scan parameters and trigger conditions for scan for an embodiment recited, further detail is provided on processes and application operating on wireless device 116a to implement same.

Figure 3:
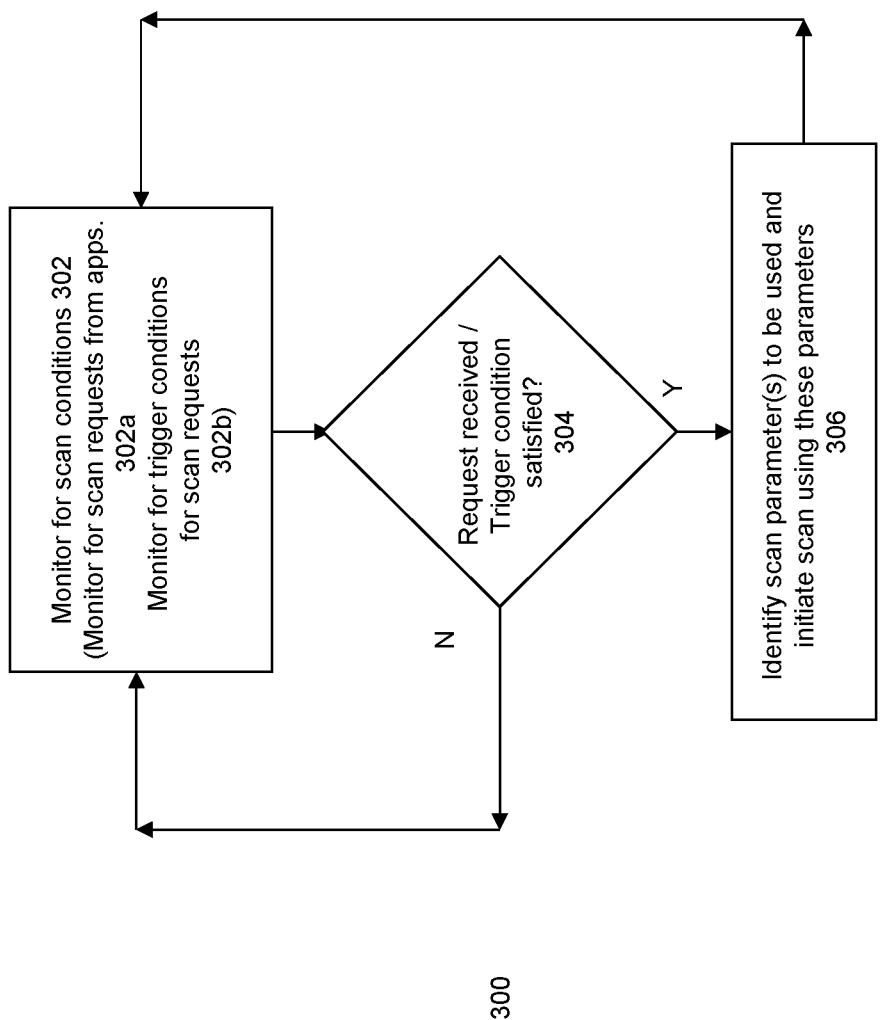
FIG. 3 is a flowchart of exemplary processes executed by the communication device in FIG. 1A in identifying an intermediary device to be inserted into a communication link between the communication device and the access point according to an embodiment.

Referring to FIG. 3, process 300 shows a flow chart of processes executed by device 116a in executing processes noted above for the first and second features.

Process 300 starts with process 302, where device 116a monitors (or has monitored for it by an external device) scan requests other conditions. Typically, process 302 may be provided in a background process that allows other actions and input/output signals to be conducted on device 116a; however, process 302 may be conducted in a dedicated monitoring loop, where no other functions are executed, while it is operating. There are two components to process 302, each component may be provided and may operate independently of the other. The components may be executed in any order. In some embodiments only one of the two components are provided. In other embodiments, additional components are provided. For the first component, process 302a monitors for a first condition, namely for network scan requests from application, modules, processes, components and/or external devices to device 116a. For the second component at process 302b, a related monitoring is conducted for other (second) conditions, which may have been predetermined, that, if satisfied, cause device 116a to initiate a network scan. Alternatively or additionally, a set of conditions may be monitored that, when satisfied, cause wireless device 116a to not initiate a network scan. The conditions or related parameters may be related to wireless device 116a, AP 110b, Wi-Fi network 118 or other devices. Signalling protocols may be established among devices in W-Fi network 118 and the devices may send various signals to each other to provide message requests and/or indicate triggering conditions and other status that may be used to indicate that a network scan is desired or prohibited.

In process 304, results of monitoring for the scan request(s) and/or the trigger conditions are tested against their related thresholds. For example, one exemplary threshold parameter for network requests is that the requests may be required to be sent by their related applications at a certain frequency and/or at a certain time. This acts as a "ping" signal from the application to device 116a. If the requests are not received at the required frequency (namely within a predetermined period of time) then the request may be denied/ignored. Other triggers may be used, such as a requirement for a minimum number of requests to be received before a scan is initiated.

As part of the tests, the status of other aspects of wireless device 116a, Wi-Fi network 118 and/or AP 110a may also be evaluated against any related thresholds. For example, conditions for parameters may be evaluated as described in Table A. If the request parameters and/or the trigger condition(s) are not satisfied, then the scan may not be initiated. The request parameters and the trigger conditions may be weighted to provide a total request "score" that can be evaluated against a total score threshold. If the thresholds are not satisfied, then process 300 loops back to process 302.

For example, in process 304, if the requests are received at the required frequency (or at a higher frequency) and/or if other conditions are satisfied, then process 300 moves to process 306, where the parameters for a network scan are set according to parameters associated with the just satisfied requests/trigger conditions. Also, a scan providing an aggregated set of parameters from a set of the scan requests can be provided. After the scan is completed (or if the scan is terminated), process 306 may return to process 302.

As noted earlier, different conditions may have different threshold and a condition having a certain value may cause wireless device 116a to take one action (e.g. initiate a network scan) and another value to take a different action (e.g. stop network scans).

In operation, consider an environment where two or more applications are making network scan requests for wireless device 116a. Using process 300, an embodiment aggregates the network scan requests from the applications into a reduced set of connection requests. For example, if a first application sends two connection requests with a period of time and a second application send another connection request between the other two requests, then instead of issuing three separate connection requests, an embodiment can determine that none, one or two connection requests can be issued at a certain time in response to the three connection requests received. As such, an embodiment may track an elapsed time since the execution of a previous scan request and if the elapsed time is not less than a period of time, the (current) scan may be initiated. Other tracking mechanisms can be used to ensure that a previous scan has not occurred within a given period of time. Also, the aggregated request can have aggregated scan parameters when its scan(s) are conducted. For example, if two (or more) separate scan requests are received that request scan(s) of different channels, then a single aggregated scan request can be initiated that includes scans over the requested different channels, subject to any other scan parameters provided.

Although process 300 describes processes and facilities for wireless device 116a to identify conditions and parameters for making (or prohibiting) network scan requests, other embodiment may provide control/signals for other requests that may or may not relate to W-Fi network 118 and/or AP 116a. An embodiment may implement part of all of functions described in process 300 in different orders or through different mechanisms (e.g. such as through a state machine).

A scan profile for wireless device 116a may be provided that sets parameters for scans for wireless device 116a. The scan profile can contain scan parameters that sets scanning behaviours for wireless device 116a under various conditions. For example, scan parameters can be set for when wireless device 116a is: newly configured (e.g. brand new and about to be initialized), static (e.g. not moving) and moving (e.g. moving from one jurisdiction to another jurisdiction). For a particular device condition (e.g. static), a set of trigger conditions can be stored in the related scan profile (e.g. profile #1=static). This would then allow a user, operator or manufacturer of wireless device 116a to assign a default set of trigger conditions for this condition. Scan profiles may be updated as required. When wireless device 116a is moving, it may use a "moving" scan profile having different scan parameters (e.g., when device wireless 116a is in Paraguay and is moving less than 5 km per hour, use the 5 GHz band for scans).

Process 300 may be operating in the background of wireless device 116a. Process 300 may be implemented in an API that allows software and applications operating on wireless device 116a to access the functionality of the API through a program call. As such, in an API, several calls may be received from several different applications operating on wireless device 116a. In such a situation, the API may arbitrate among received requests to rank and/or combine the requests to determine an overall set of trigger conditions and frequency of scan values. In other embodiments, the features of process 300 may be embedded in applications operating on wireless device 116a. As such, other processes and applications may be concurrently operating on wireless device 116a. While not shown in process 300, a stop condition may be provided to exit process 300. The stop condition(s) may be incorporated as part of process 302 and 304 and upon satisfaction of the stop condition(s), process 300 would end. As such, upon satisfaction of the stop condition, an embodiment would discontinue to send further network scan messages to the network. It will be appreciated that processes 304, 306 and 308 may be executed in different orders and at different times than provided in process 300. It will be seen that process 300 may receive and react to external triggers and signals from wireless device 116a to re-start process 300 (e.g. user intervention) to minimize process "freezing" conditions. For example, if wireless device 116a is turned off and then turned on a network scan may be immediately useful to wireless device, 116a and as such, if process 300 had previously been activated, it may be terminated and a "hard" network scan request may be initiated.

It will be appreciated that other embodiments may provide other network functions (e.g. other network status requests, sending of messages to a network, etc.), instead of network scans using features of process 300 and the related description.

With aspects of main features of an embodiment described, further detail is now provided on internal components in wireless device 116a, which may be also found in device 104d and AP 110b.

Figure 4:
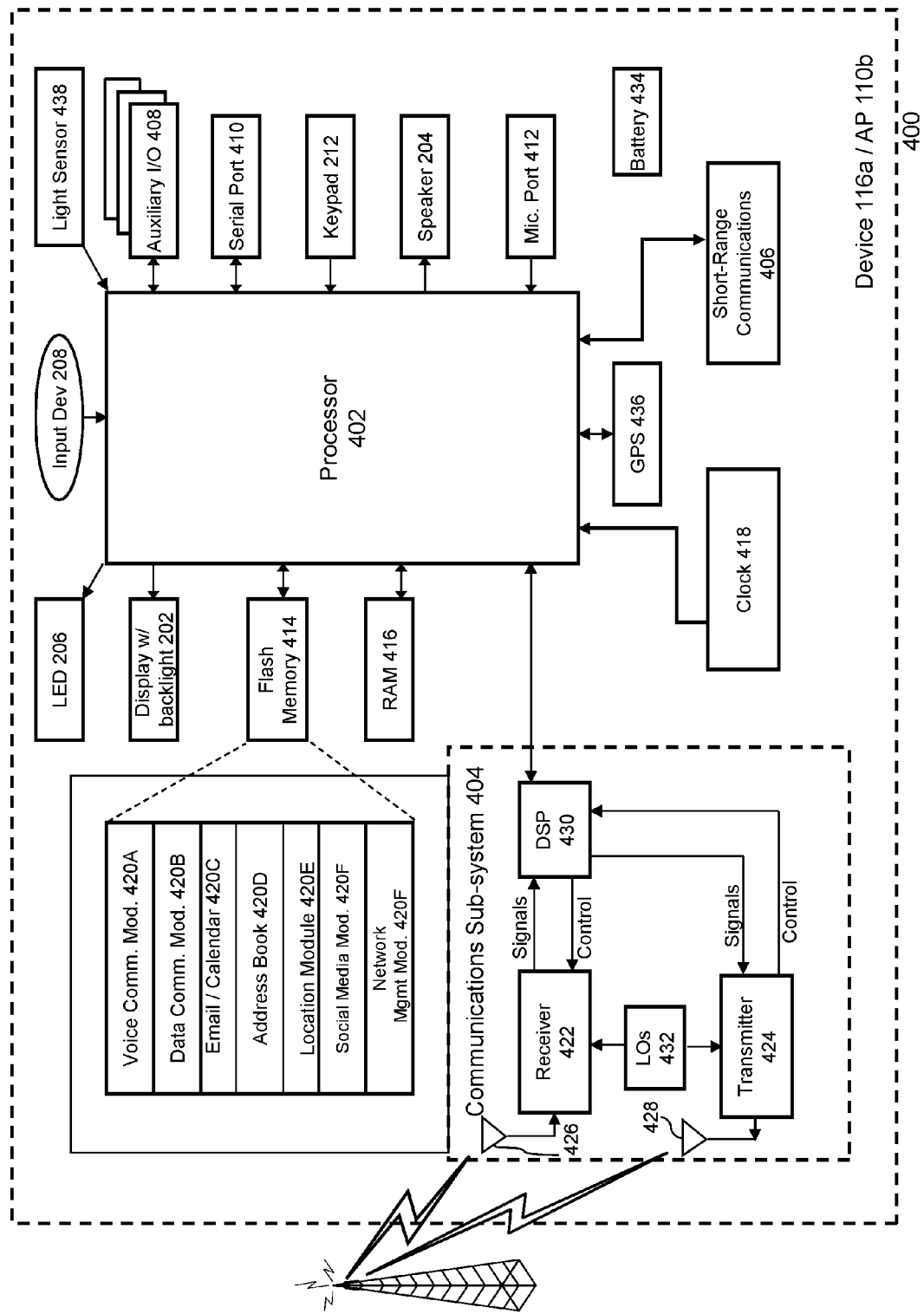
FIG. 4 is a block diagram of internal components of the communication device of FIG. 1A.

With features of various embodiments described, referring to FIG. 4, functional components of wireless device 116a are provided in schematic 400. The functional components are generally electronic, structural or electro-mechanical devices. In particular, processor 402 is provided to control and receive almost all data, transmissions, inputs and outputs related to wireless device 116a. Processor 402 is shown schematically as coupled to keypad 212 and other internal devices. Processor 402 preferably controls the overall operation of wireless device 116a and its components. Exemplary processors for processor 402 include processors in the Data 950 (trade-mark) series, the 6200 series and the PXA900 series, all available at one time from Intel Corporation. Processor 402 is connected to other elements in device 116a through a series of electrical connections to its various input and output pins. Processor 402 has an IRQ input line which allows it to receive signals from various devices and modules. Appropriate interrupt firmware is provided which receives and reacts to the signals detected on the IRQ line. An interrupt signal may be used to indicate a request to terminate the segmented scanning mode of an embodiment.

In addition to processor 402, other internal devices of wireless device 116a are shown schematically in FIG. 4. These include: display 202; speaker 204; keypad 212; communication sub-system 404; short-range communication sub-system 406; auxiliary I/O devices 408; serial port 410; microphone port 412 for microphone 216; flash memory 414 (which provides persistent storage of data); random access memory (RAM) 416; clock 418 and other device sub-systems (not shown). Device 116a is preferably a two-way radio frequency (RF) communication device having voice and data communication capabilities. In addition, device 116a preferably has the capability to communicate with other computer systems via the Internet.

Operating system software executed by processor 402 is preferably stored in a computer-readable medium, such as flash memory 414, but may be stored in other types of memory devices, such as read-only memory (ROM) or similar storage element. In addition, system software, specific device applications, or parts thereof, may be temporarily loaded into a volatile store, such as RAM 416. Communication signals received by device 116a may also be stored to RAM 416.

In addition to an operating system operating on wireless device 116a, additional software modules 420 enable execution of software applications on wireless device 116a that provide instructions for execution on the processor of wireless device 116a. A set of software (or firmware) applications, generally identified as modules 420, that control basic device operations, such as voice communication module 420A and data communication module 420B, may be installed on wireless device 116a during manufacture or downloaded thereafter. As well, other software modules are provided, such as email/calendar module 420C, address book 420D, location module 420E and social media module 420F. Any of these modules may have features that require an update regarding the current location of wireless device 116a or that require a connection to W-Fi network 118. The location of the device may be provided via a network scan. Applications may require network scans to provide location data to their networks. For example, social media module 420F may be linked to one or more social media services, such as services from Facebook or Foursquare (trademarks), which may require updates to the current location of wireless device 116a. These updates may be provided through network scan requests. Module 420F may require frequent location information, which again, may be provided by a network scan. As such, module 420F may have call routines built into it to make one or more calls to an API (as described herein) to request that wireless device 116a make a network scan request. Any application that depends on location may initiate scans, e.g. a social network application, a local search application, a security application, WLAN diagnostics applications, etc. The content and frequency of the API calls can be tailored to the requirements of the API, as described herein. Similarly, email/calendar module 420C and location module 420E may have similar needs for connection requests.

Messages received and/or generated by any module 420 may be processed by data communications module 420B. Messages may be transmitted/received in network layer communications, emails, and/or other messaging systems to Wi-Fi network 118, AP 110b and/or wireless devices 116b-d. Module 420B receives messages from external devices, extracts relevant information from them and provides the information to relevant modules. Module 420B notifications from modules 420, extracts relevant information from them and generates and sends messages containing relevant information to the messages to Wi-Fi network 118, including to devices 110. Messages relating to network 112 for wireless device 116a, when operating as an AP may be processed separately by the modules from other non-network communications (e.g. cellular communications).

Network management module (NMM) 420G is software and/or firmware that processes network functions for W-Fi network 118 for wireless device 116a. This includes monitoring the status of wireless device 116a and managing incoming and outgoing network management communications. In an embodiment NMM 420G receives request for network scans from applications operating on wireless device 116a and monitors network conditions and local operating conditions of wireless device 116a, for example, statuses evaluated in Table B above. Depending on the values of those conditions and the requests from the applications, NMM 420G may cause wireless device 116a to initiate and conduct a network scan that follows parameters identified Table A. Communications and data are streamed through either communication module 404 or 406. NMM 420G may also receive signals from other modules providing information to it on other modules that are using communication module 404 or 406. Processes to evaluate and authenticate scan requests from other devices may be provided in NMM 420G. Communications also can be processed with server 122. Functions of NMM 420G may be distributed to other modules 420 in wireless device 116a.

Additional modules such as personal information manager (PIM) application may be provided. Any module may be installed during manufacture or downloaded thereafter into wireless device 116a.

Data associated with each module, the status of one or more networks, profiles for networks and trigger conditions for commands for networks may be stored and updated in flash memory 414.

Communication functions, including data and voice communications, are performed through the communication sub-system 404 and the short-range communication sub-system 406. Collectively, sub-systems 404 and 406 provide the signal-level interface for all communication technologies processed by wireless device 116a. Various applications 420 provide the operational controls to further process and log the communications. Communication sub-system 404 includes receiver 422, transmitter 424 and one or more antennas, illustrated as receive antenna 426 and transmit antenna 428. In addition, communication sub-system 404 also includes processing modules, such as digital signal processor (DSP) 430 and local oscillators (LOs) 432. The specific design and implementation of communication sub-system 404 is dependent upon the communication network in which wireless device 116a is intended to operate. For example, communication sub-system 404 of wireless device 116a may on network technologies described earlier (e.g. NFC, GPRS, IEEE 802.11 networks, IEEE 802.11 P2P networks, Bluetooth networks, Zigbee, television-band white spaces or other geo-location database dependent technologies, AMPS, TDMA, CDMA, CDMA 2000, PCS, GSM, WWAN, WMAN, WLAN, WPAN, IM, TM, SMS, etc.).

Short-range communication sub-system 406 enables communication between wireless device 116a and other proximate systems or devices, which need not necessarily be similar devices. For example, the short-range communication sub-system may include an infrared device and associated circuits and components, a W-Fi or a Bluetooth (trademark) communication module to provide for communication with similarly enabled systems and devices. Sub-system 406 may have one or more inputs or outputs to sub-system 404 in processing signals for its networks.

In addition to processing communication signals, DSP 430 provides control of receiver 426 and transmitter 424. For example, gains applied to communication signals in receiver 426 and transmitter 424 may be adaptively controlled through automatic gain-control algorithms implemented in DSP 430. One particular operational aspect of receiver 422 and antenna 426 is that they need to be tuned to receive signals in the IEEE 802.11 network bands, e.g. signals in the 2.4 GHz to 6 GHz range for sub-systems 406 and if needed, sub-system 404. Additional filters on antenna may also be used to provide such functionality.

Receiver 422 and antenna 426 provide at least some of the hardware and software elements needed to detect when wireless device 116a is in the presence of communication signals from Wi-Fi network 118 and WAN 112.

Powering the entire electronics of the mobile handheld communication device is power source 434. In one embodiment, the power source 434 includes one or more batteries. In another embodiment, the power source 434 is a single battery pack, especially a rechargeable battery pack. A power switch (not shown) provides an "on/off" switch for wireless device 116a. A power source interface (not shown) may be provided in hardware, firmware, software or a combination of such elements to selectively control access of components in wireless device 116a to power source 434. Upon activation of the power switch an application 420 is initiated to turn on wireless device 116. Upon deactivation of the power switch, an application 420 is initiated to turn off wireless device 116. Power to wireless device 116a may also be controlled by other devices and by software applications 420.

Wireless device 116a may also have global positioning system (GPS) 436 to assist in identifying a present location of wireless device 116a and may also have light sensor 438 to provide data on the ambient light conditions for wireless device 116a.

Although an embodiment has been described in terms of identifying/maintaining server/client device hierarchies in a wireless network, such as an IEEE 802.11 network, the features of an embodiment may be provided in coordinate aspects of different connections among different devices in different networks.

Other features of an embodiment can control how and when wireless device 116a associates and re-associates when AP 110a. For example, if AP 110a disassociates from wireless device 116a, then can cause device 116a to make a re-association with AP 110a. Parameters for how and when a re-association is made may follow constructs of how and when a network scan is initiated by wireless device 116a for an embodiment as described herein.

An embodiment can also initiate a network scan based on external signals or conditions around wireless device 116a. For example, in one embodiment, a network scan may be initiated by AP 110a (or another external device) to wireless device 116a. Specifically, AP 110a may force wireless device 116a to perform a scan, per beacon measurement guidelines and location tracking guidelines provided in IEEE 802.11-2012. Also, AP 110a may disassociate wireless device 116a, which would then trigger wireless device 116a to re-associate with AP 110a, which is similar to forcing wireless device 116a to initiate a network scan. In geo-location database networks, the database or its proxy server may send a disassociate message to wireless device 116a, which would cause just-disassociated wireless device 116a to initiate a scan.

It will be appreciated that social media module 420F, NMM 420G and other modules in the embodiments may be implemented using known programming techniques, languages, processes and algorithms. Although the modules, processes and applications described are implemented in wireless device 116a, it will be appreciated that some functions of the modules may be provided in a separate server that is in communication with wireless device 116a. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on wireless device 116a may be executing concurrently with other modules. As such, any of modules 420 (or parts thereof) may be structured to operate in as a "background" application on wireless device 116a, using programming techniques known in the art.

It will be appreciated that the embodiments relating to client devices, server devices and systems may be implemented in a combination of electronic modules, hardware, firmware and software. The firmware and software may be implemented as a series of processes, applications and/or modules that provide the functionalities described herein. The modules, applications, algorithms and processes described herein may be executed in different order(s). Interrupt routines may be used. Data, applications, processes, programs, software and instructions may be stored in volatile and non-volatile devices described and may be provided on other tangible medium, like USB drives, computer discs, CDs, DVDs or other substrates herein and may be updated by the modules, applications, hardware, firmware and/or software. The data, applications, processes, programs, software and instructions may be sent from one device to another via a data transmission.

As used herein, the wording "and/or" is intended to represent an inclusive -or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method comprising:
  receiving, at an application program interface (API) residing on a communication device, a request to initiate a network scan for a wireless network, the request comprising one or more requested network scan parameters; and
  in response to receiving the request:
    adjusting network scan parameters for the network scan based on the one or more requested network scan parameters when the request is received within a first time period and a previous network scan has not been initiated by the communication device within a second time period; and,
    configuring and initiating the network scan according to the network scan parameters that have been adjusted.

2. The method as claimed in claim 1, wherein the wireless network is an institute of electrical and electronic engineers (IEEE 802.11) class network.

3. The method as claimed in claim 1, wherein the wireless network is a short-range wireless network.

4. The method as claimed in claim 1, wherein the one or more requested network scan parameters comprise a data rate parameter indicative of a data rate for the network scan.

5. The method as claimed in claim 1, wherein the one or more requested network scan parameters comprise one of a maximum number of scans parameter indicative of maximum number network scan cycles to be performed and a minimum number number of scans parameter indicative minimum number of network scan cycles to be performed.

6. The method as claimed in claim 1, wherein the one or more requested network scan parameters comprise a channel list parameter indicative of one or more frequency channels for the network scan.

7. The method as claimed in claim 1, wherein the one or more requested network scan parameters comprise a network scan parameter comprises one of a scan time parameter, a scan period parameter, and a scan interval parameter.

8. The method as claimed in claim 1, wherein the one or more requested network scan parameters comprise a power parameter indicative of a power of a communication signal for the network scan.

9. The method as claimed in claim 1, wherein the one or more requested network scan parameters comprise at least one of a minimum dwell time parameter, a maximum dwell time parameter, and a probes parameter indicative of a number of probes for the scan.

10. The method as claimed in claim 1, further comprising:
in response to detecting a stop condition to stop the network scan, terminating the network scan.

11. The method as claimed in claim 10, further comprising:
after the stop condition is detected, monitoring for a restart condition to recommence the network scan for the communication network; and
in response to detecting the restart condition, recommencing the network scan.

12. The method as claimed in claim 11, wherein the communication device utilizes a part of a frequency spectrum that is in a white space of frequencies for television signal transmissions.

13. The method as claimed in claim 1, further comprising:
prior to initiating and configuring, receiving, at the API, a second request to initiate the network scan for the communication network, the second request comprising one or more second requested network scan parameter;
aggregating the one or more requested network scan parameters received from the request and the one or more second requested network scan parameters received from the second request to form aggregated requested network scan parameters; and
wherein adjusting comprises adjusting the network parameters based on the aggregated requested network scan parameters.

14. The method as claimed in claim 1, wherein the network scan is part of a script of a plurality of network scans executed at the communication device.

15. The method as claimed in claim 1, wherein the network scan parameters are provided in a scan profile associated with the communication device.

16. A communication device comprising:
a processor;
a memory storing an at an application program interface (API) comprising
computer-readable instructions executable by the processor for:
receiving a request to initiate a network scan for a wireless network, the request comprising one or more requested network scan parameters; and
in response to receiving the request:
adjusting the network scan parameters based on the one or more requested network scan parameters when the request is received within a first time period and a previous network scan has not been initiated by the communication device within a second time period; and
configuring and initiating the network scan according to the network scan parameters that have been adjusted.

17. The communication device as claimed in claim 16, wherein the network is one of an institute of electrical and electronic engineers (IEEE 802.11) class network and a short-range wireless network.

18. The communication device as claimed in claim 16, wherein the one or more requested network scan parameters comprise a data rate parameter indicative of a data rate for the network scan.

19. The communication device as claimed in claim 16, wherein the one or more requested network scan parameters comprise a number of scans parameter indicative of one of a maximum number network scans and a minimum number of network scans.

20. The communication device as claimed in claim 16, wherein the one or more requested network scan parameters comprise a channel list parameter indicative of one or more frequency channels for the network scan.

21. A non-transitory computer-readable medium comprising computer-readable instructions which when executed by a processor of a communication device cause an application program interface (API) residing on a communication device to:
receive a request to initiate a network scan, the request comprising one or more requested network scan parameters; and
in response to receipt of the request:
adjust the network scan parameters based on the one or more requested network scan parameters when the request is received within a first time period and a previous network scan has not been initiated by the communication device within a second time period; and,
configure and initiate the network scan according to the network scan parameters that have been adjusted.

* * * * *